(12) United States Patent
Pierce

(10) Patent No.: US 10,027,788 B2
(45) Date of Patent: Jul. 17, 2018

(54) SYSTEM AND METHOD OF ATTACHING CELLULAR DEVICE ACCESSORIES

(71) Applicant: Zachary Pierce, West Chester, PA (US)

(72) Inventor: Zachary Pierce, West Chester, PA (US)

( * ) Notice: Subject to any disclaimer, the term of this patent is extended or adjusted under 35 U.S.C. 154(b) by 0 days.

(21) Appl. No.: 15/522,561

(22) PCT Filed: Oct. 27, 2015

(86) PCT No.: PCT/US2015/057660
§ 371 (c)(1),
(2) Date: Apr. 27, 2017

(87) PCT Pub. No.: WO2016/069652
PCT Pub. Date: May 6, 2016

(65) Prior Publication Data
US 2017/0339266 A1    Nov. 23, 2017

Related U.S. Application Data

(60) Provisional application No. 62/069,267, filed on Oct. 27, 2014.

(51) Int. Cl.
| | |
|---|---|
| *H04M 1/725* | (2006.01) |
| *H04M 1/02* | (2006.01) |
| *H04M 1/03* | (2006.01) |
| *H04B 1/3888* | (2015.01) |

(52) U.S. Cl.
CPC ...... *H04M 1/72522* (2013.01); *H04B 1/3888* (2013.01); *H04M 1/0202* (2013.01); *H04M 1/026* (2013.01); *H04M 1/035* (2013.01)

(58) Field of Classification Search
None
See application file for complete search history.

(56) References Cited

U.S. PATENT DOCUMENTS

| | | |
|---|---|---|
| 5,906,031 A | 5/1999 | Jensen |
| 7,612,997 B1 | 11/2009 | Diebel et al. |
| 2010/0208434 A1 * | 8/2010 | Kim ...................... G06F 1/1626 361/729 |
| 2012/0042476 A1 | 2/2012 | Karmatz |

(Continued)

FOREIGN PATENT DOCUMENTS

| | | | | |
|---|---|---|---|---|
| EP | 2018030 A1 * | 1/2009 | ........... | G06F 1/1632 |

OTHER PUBLICATIONS

PanaVise: "Model: 15504 PortaGrip with Windshield Mount", https//www.panavise.com/index.html?pageID=1&page=full&—eqskudatarq+235, Oct. 4, 2014.

(Continued)

*Primary Examiner* — Paul Huber
(74) *Attorney, Agent, or Firm* — Cozen O'Connor

(57) ABSTRACT

A speaker system is removably attached to a cellular telephone or telephone case to augment or supplant audio output of the phone. In one example, the system includes a protective telephone case with built in speakers. The attachment mechanism may alternatively or additionally be used as a universal attachment for cellular telephone accessories. The system may include a fastening mechanism configured to attach any accessory to a phone surface.

15 Claims, 8 Drawing Sheets

(56) References Cited

U.S. PATENT DOCUMENTS

| | | |
|---|---|---|
| 2013/0052956 A1 | 2/2013 | McKell |
| 2014/0044020 A1 | 2/2014 | Mikkelsen et al. |
| 2014/0187289 A1 | 7/2014 | Cataldo et al. |
| 2014/0317329 A1* | 10/2014 | Barnett ................. G06F 1/1632 710/304 |
| 2015/0077927 A1* | 3/2015 | Barnett ................. G06F 1/1626 361/679.43 |
| 2015/0146083 A1* | 5/2015 | Kim ................... H04N 5/23209 348/360 |

OTHER PUBLICATIONS

Supplementary European Search Report dated May 5, 2018 in corresponding European Patent Application No. 15856146.4.

* cited by examiner

SYSTEM AND METHOD OF ATTACHING CELLULAR DEVICE ACCESSORIES

I. CLAIM OF PRIORITY

This application is a continuation patent application of, and claims priority from, U.S. Provisional Patent Application Ser. No. 62/069,267, filed on Oct. 27, 2014, which is incorporated by reference herein in its entirety for all purposes.

II. FIELD OF THE DISCLOSURE

The disclosure relates to speaker technologies, and more particularly, to speakers used in portable electronic devices.

III. BACKGROUND

Advances in cellular telephones and other portable electronic devices make them convenient platforms for media applications. For example, cellular telephones are routinely used to enjoy music and other digital media. The portable nature of such devices requires that their associated circuitry to be relatively small. Small space requirements can pose challenges and inherent limitations to producing a quality and satisfying audio listening experience.

IV. SUMMARY OF THE DISCLOSURE

In a particular embodiment, an apparatus includes a housing configured to attach to at least one of a cellular telephone and a case for the cellular telephone. A receiver is positioned within the housing, and speaker circuitry is positioned within the housing.

In one example, a memory is positioned within the housing. The memory stores audio content. The memory may store an application configured enable a user to adjust audio tone. The memory may additionally or alternatively store usage information pertaining to what a user listens.

In one implementation, the housing attaches to a surface of another object. The receiver may be configured to receive at least one of Bluetooth, Wi-Fi, and satellite signals. The receiver may be configured to receive an audio signal via a wire from the cellular telephone. The receiver, may be configured for use as a speakerphone.

According to another particular embodiment, an apparatus includes a housing configured to attach to at least one of a cellular telephone and a case for the cellular telephone. The housing is configured to expand. Speaker circuitry is positioned within the housing.

The housing of an embodiment includes first and second surfaces that form an acute angle. The housing of the same or an alternative embodiment includes an accordion structure. The housing expands selectively and reversibly. The housing of an embodiment is integral with the case. In another embodiment, the housing is distinct from a case of the cellular telephone.

According to another particular embodiment, an apparatus includes a housing and a fastener attached to the housing. The fastener, or fastening structure, is configured to removably attach to at least one of a cellular telephone and a case for the cellular telephone. The fastener may further be configured to removably attach to another object.

Speaker circuitry may be positioned within the housing or case. In an, alternative embodiment, wireless speaker circuitry is positioned within the housing. In a specific embodiment, the fastener is coin-shaped. The object removably attaches using at least one of a magnet, an adhesive, a hook and loop fastener, and a mechanically interlocking mechanism.

These and other advantages and features that characterize embodiments are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments.

VI. DETAILED DESCRIPTION

Figure 1:
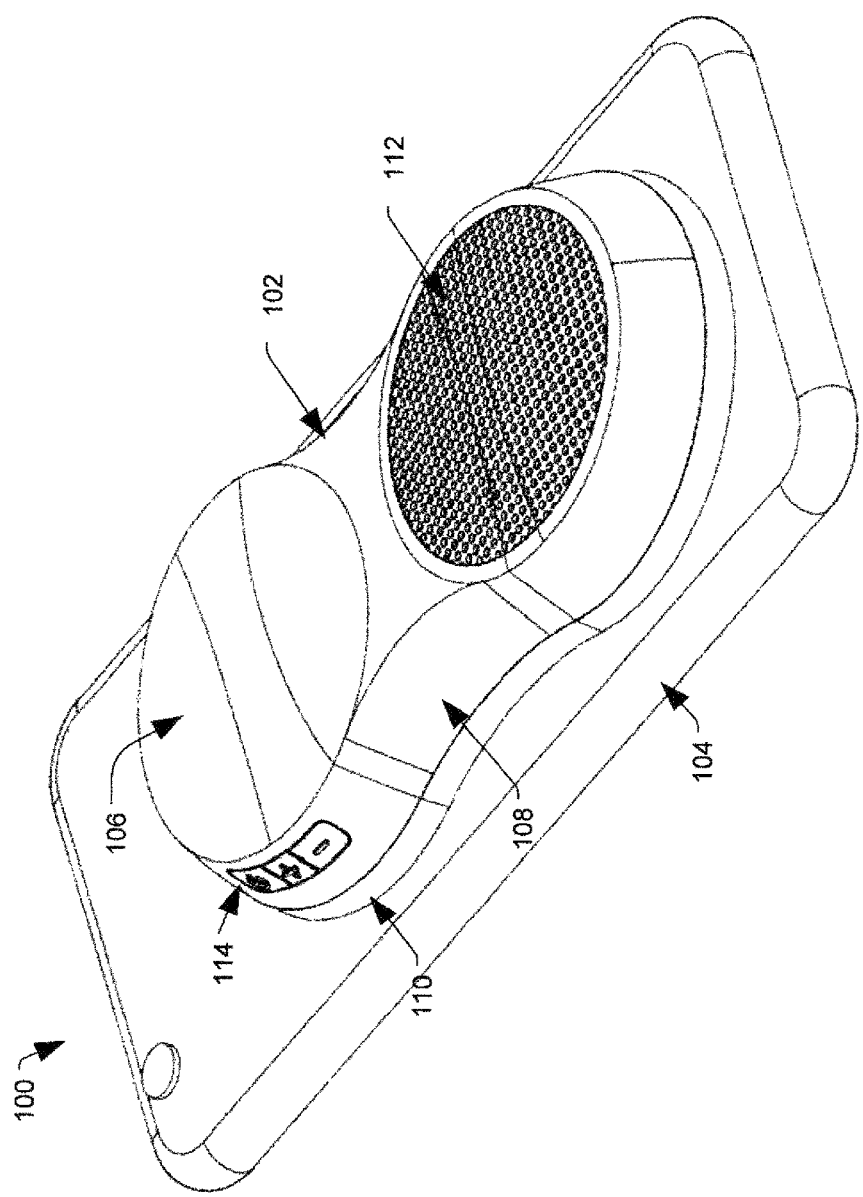
FIG. 1 is a perspective view of a speaker system configured to attach to cellular telephone.

A speaker system may be removably attached to a cellular telephone or telephone case to augment or supplant audio output of the phone. In one example, the system includes a protective telephone case with built-in speakers. The attachment mechanism may alternatively or additionally be used as a universal attachment for cellular telephone accessories. The speaker system may include a fastening mechanism configured to attach any accessory to a surface of a phone or case.

Moreover, the speaker system may readily attach to and detach from any portable media device. Portable media devices play audio and/or video and are not limited to tablets, smart phones, laptop computers, and portable gaming consoles, among others. An embodiment of the speaker system provides amplified sound by connecting directly to the portable media device. The portable and relatively small nature of the speaker system allows it to be carried in a pocket.

The speaker system may include a protective case with speaker assembly components constructed as a fully integrated product. According to another embodiment, the components of the speaker system and the housing may be constructed and sold separately from the protective case. The speaker system may be affixed to any device through varying methods of attachment, including magnets, adhesive, hook and loop fastener, and mechanical fastener, among others. Still another embodiment of the speaker system may include components and a housing built with a clipping, system that enables attachment to any surface to which the speaker system may be clipped.

The speaker system may receive and transmit data over a wireless connection that uses Bluetooth, satellite and other networking technologies. Alternatively or additionally, the speaker system may be connected to a cellular phone or other portable media device using a cable or other mechanical plug-in.

One or more speakers may be included in the speaker system. The speakers may be mounted on a board that also houses components for connectivity to audio, in addition to a battery or other power source. Other illustrative power sources may include wireless charging and, a plug-in connection to the portable media device or a power outlet. The board may be constructed from acrylic material, such as a polymer, resin, or fiber. However, other materials may alternatively or additionally be used.

Control circuitry housed on the board may amplify audio and may control sound effects (e.g., base, treble) through an equalizer function. The controller may communicate with the portable media device so as to adjust audio per user input received at the portable media device. Alternatively or additionally, the speaker system may receive user input pertaining to the bass, treble, volume, and other audio signal effects via its own interface. A memory may allow a user to copy and otherwise store audio files for playback.

A housing may at least partially contain the board and associated components. The housing may be constructed as a single unit with a protective case or may be built separately. As such, the housing may be constructed to fit cellular telephones having different dimensions.

The housing may include lights to automatically create a visual effect in accordance with the audio playback. The housing, itself, may be constructed of a material that changes color. In either case, a user may manually adjust the colors or lighting sequence.

As explained herein, an embodiment of the speaker system is configured to attach to a surface of any portable media device. Magnets, adhesive, clips, or other mechanical fasteners may be used to removably attach the speaker system. For example, a magnet may be affixed to a portable media device. The magnet may attach to an attractive surface of the speaker system so as to seat the surface flush with respect to one another. Another attachment mechanism may include a mechanical fastener. For instance, a fastener may secure the speaker system with a mating fastener component that is attached to the portable media device. In another example, a clipping system may include a retractable cable with a clip configured to attach to clothing, an accessory, furniture, etc. Yet another mechanical fastening mechanism may include an assembly that threads together the speaker system and the portable media device, or attaches them together using mating clips or grooves or slots.

An embodiment of the speaker system sits flush against the portable media device and maintains a standard height. Another or the same embodiment of the speaker system includes a pliable, flexible center portion that that allows a top portion of the housing to expand. A cavity may be formed between a bottom piece (attached to the portable media device surface) and the top portion. The cavity enhances sound and creates an additional base effect. When listening to audio, a user may raise the top portion of the speaker system to enhance the sound quality. The top portion may then be collapsed when not in use.

The speaker system may alternatively be built integrally with a protective case. For instance, a smart phone case may include the components of the speaker system as described herein. Likewise, the case and integral speaker system may include the expandable cavity portion or the permanent lower profile.

An embodiment provides a removable or permanent attachment system that allows a smartphone consumer the ability to attach multiple and interchangeable accessories used with smartphones. Attachment may include actual physical attachment of accessories directly to a back of the smartphone. Another embodiment may attach to a case of the phone. Multiple products, such as a speaker, may each attach using a universal attachment mechanism (e.g., using a coin).

One embodiment of an attachment mechanism may include a clip. Other or the same embodiments may include hook and loop fasteners, magnets, and adhesive, among others. Examples of accessories are not limited to: a speaker system, a selfie stick, a backup battery charger, a projector, a wallet/card holder, ear buds, and gaming device accessories (remotes, controllers) among others.

An embodiment includes an attachment system that may include a magnet, a coin-shaped fastener, a clipping system, adhesive and others that attach to any make or model of smartphone or tablet. The attachment may be permanent, semi-permanent, or a temporary.

The system may attach directly to the electronic device, or to a cosmetic or protective smartphone or tablet case. An embodiment may allow the attachment of multiple accessories at one time. The system may allow multiple and interchangeable accessories to be placed on the device (or case).

Unlike conventional smartphone accessories, embodiments may not be form fitting or tethered by a wire. As such, a user may not need to carry a product separately or purchase accessories that are form fitting to their specific phone (e.g., built in to a protective case). The universality of an embodiment accommodates different phones and tablet sizes as new models of the electronic devices are rolled out.

An embodiment may include multiple attachment/fasteners that allow not only the attachment of accessories to phones/cases, but also that attach their phones/cases, to multiple places. For example, a strap with a coin (attachment system) may be put around a bicycle or user's arm to attach to accessories. An embodiment of the system may be original equipment manufactured or may sold separately from an electronic device or case.

The attachment mechanism may include a quick release button for temporary items like a speaker, or battery pack, but the system may also include another type of fastener, such as where a pin is clipped though. Such an embodiment may, have particular application with heavier items, such as with a selfie stick.

Turning more particularly to the Drawings, FIG. 1 is a perspective view of an apparatus 100 that includes a speaker system 102 that is attached to a case 104 of a cellular telephone. The speaker system 102 includes a housing 106 configured to attach to at least one of the cellular telephone (not shown) and the case 104. The housing 106 may be removably attached. In another embodiment, however, the housing may be integral with the case, or permanently attached.

As shown in the embodiment of FIG. 1, the housing 106 includes top portion 108 and a bottom portion 110. A receiver is positioned within the housing, in addition to a speaker 112 and associated circuitry. The housing 106 further includes a user interface 114 for controlling aspects of the audio playback, including volume and power to the speaker system 102.

Figure 2:
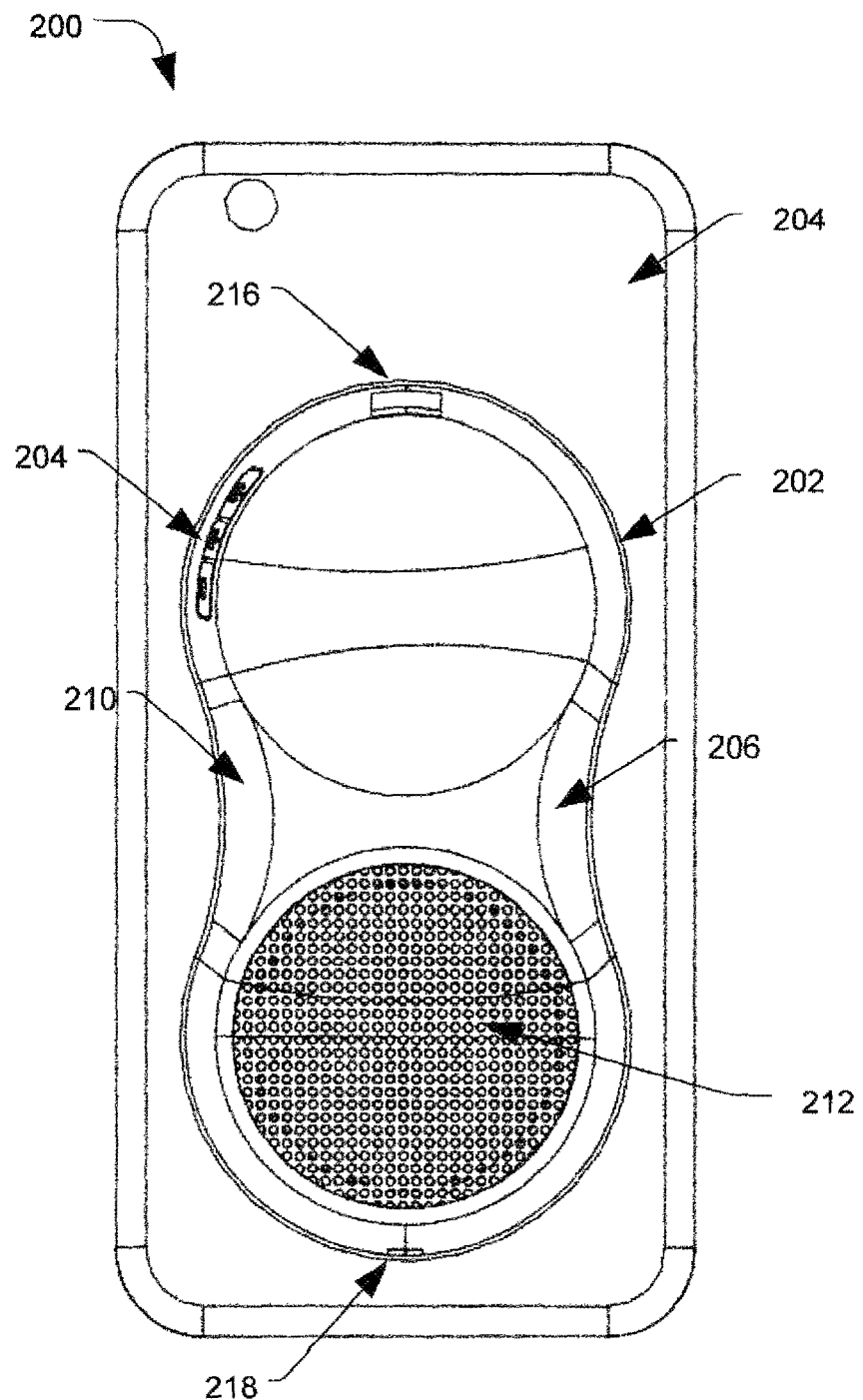
FIG. 2 is a top view of a speaker system configured to attached to a cellular telephone.

FIG. 2 is a top view of an apparatus 200 that includes a speaker system 202 attached to a case 204 of a cellular telephone. The speaker system 202 includes a housing 206 that includes a speaker 212 and a user interface 214. The speaker system 202 is expandable and includes releasing fasteners 216, 218 for selectively pinning down or releasing a top portion 210 of the housing 206.

Figure 3:
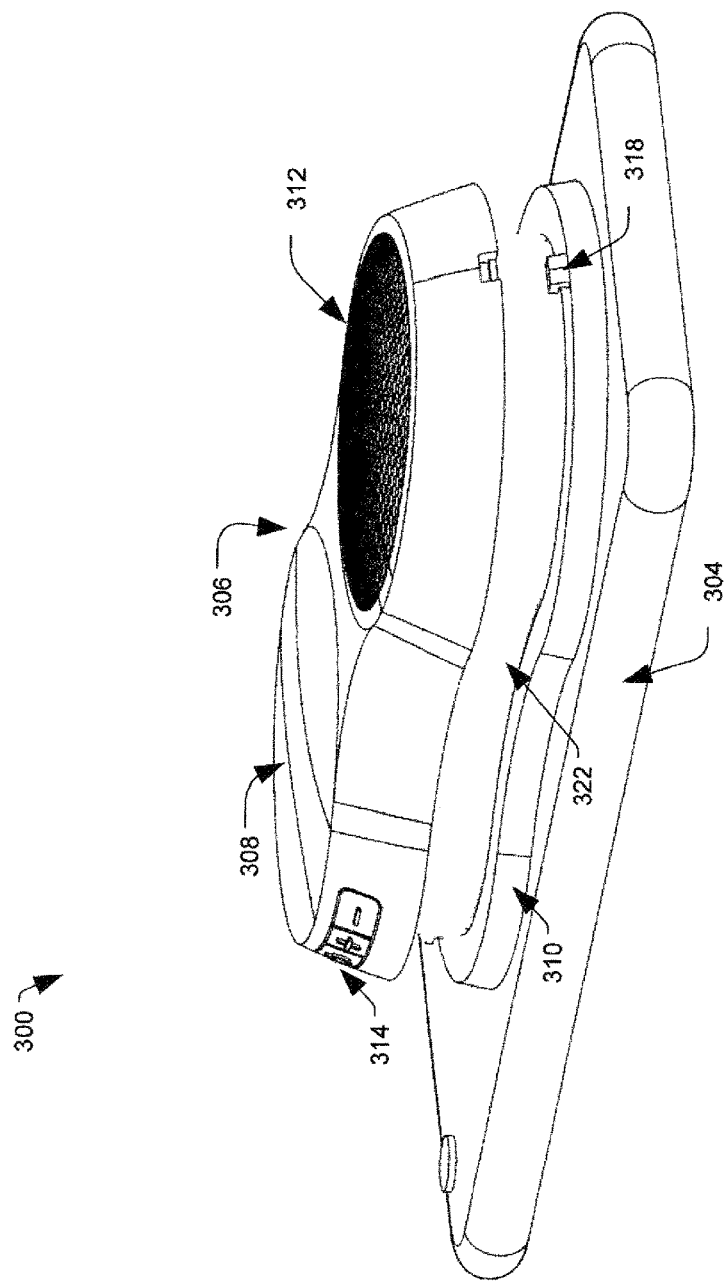
FIG. 3 is a perspective view of an attachable speaker system configured to expand to create a cavity.

FIG. 3 is a perspective view of an apparatus 300 that includes a speaker system 302 that is attached to a case 304 of a cellular telephone. The speaker system 302 includes a housing 306 that is selectively expandable and collapsible. The housing 306 of FIG. 2 is removably attached. The housing of another embodiment may be integral with the case, or permanently attached.

The housing 306 includes top portion 308 and a bottom portion 310. The top portion 308 includes a speaker 312, and the bottom portion 310 removably attaches to a surface of the case 304. An expandable portion 322 of the housing 306 is secured or released using a releasing fastener 318. The accordion structure of the expandable portion 322 includes first and second surfaces that form an acute angle. While an accordion structure is shown in FIG. 3, an expandable portion of another embodiment may use telescoping or a component that rotates on an axis.

Figure 4:
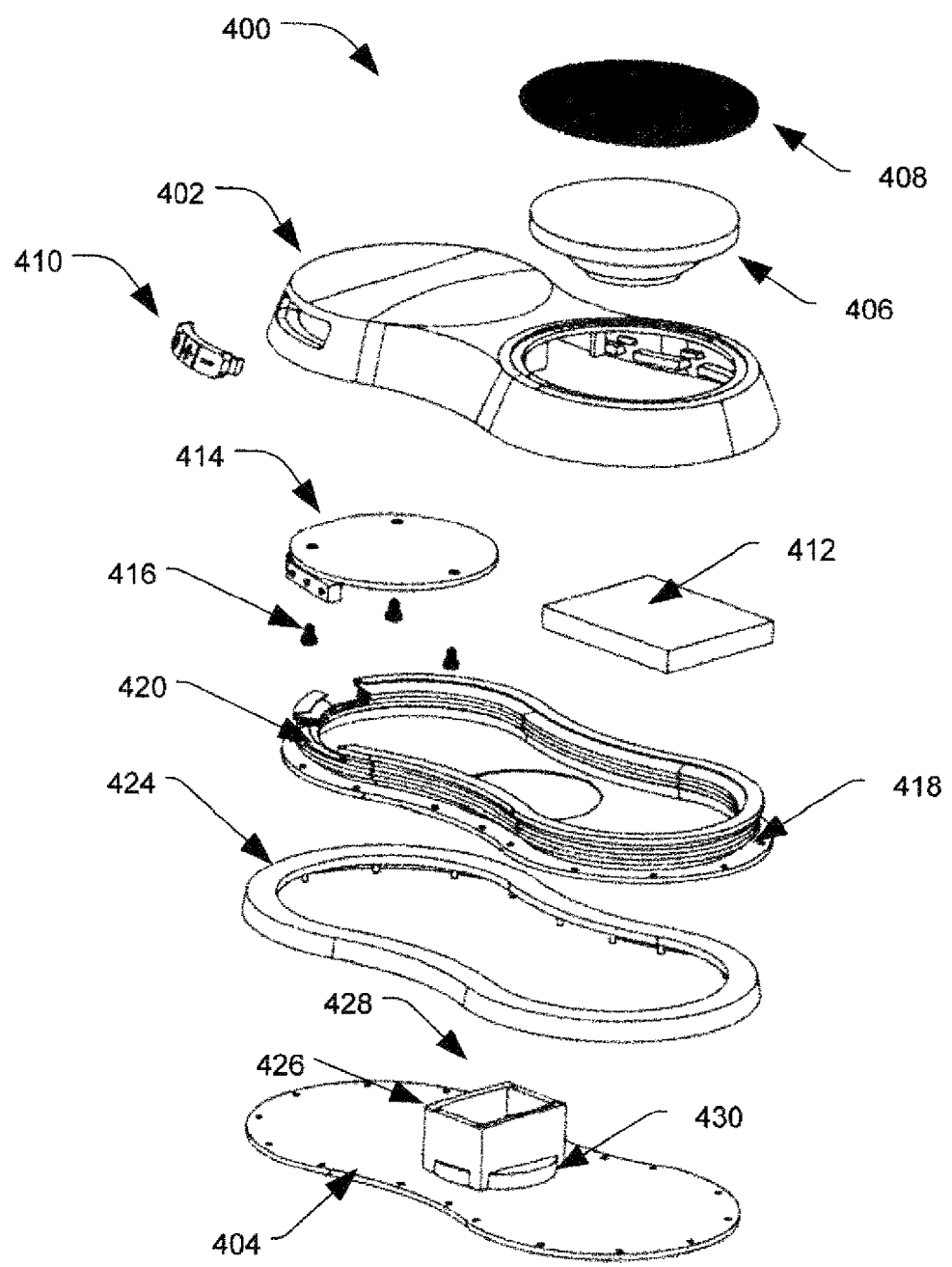
FIG. 4 is an exploded view of speaker phone system configured to attach to portable media device.

FIG. 4 is an exploded view of a speaker system 400 that includes a top portion 402 and a bottom portion 404 of a housing. The top portion 402 houses a speaker 406 and a speaker cover 408. A user interface 410 allows a user to manipulate volume, and power attributes.

Circuitry 412 may be mounted on a plate 414 that is secured using fasteners 416. The circuitry 412 may include a receiver configured to receive, at least one of Bluetooth, and satellite signals, as well as a memory storing audio content. The memory may store an application configured enable a user to adjust audio tone. The memory may additionally or alternatively store usage information pertaining to what a user listens. The usage information may be uploaded manually or automatically to a central server to be available for applications tracking such information. The circuitry 412 may interface with a controller of a portable media device to allow a user to adjust audio settings of the system 400 via an interface of the portable media device.

An expandable portion 422 may be mounted on base structures 418, 424. The expandable portion may be similar to the expandable portion 322 of FIG. 3.

An attachment structure 426 may include a magnet 428 and a fastener interface 430. The magnet 428 and fastener interface 430 may connect to a fastener that is attached to a surface of portable media device.

Figure 5:
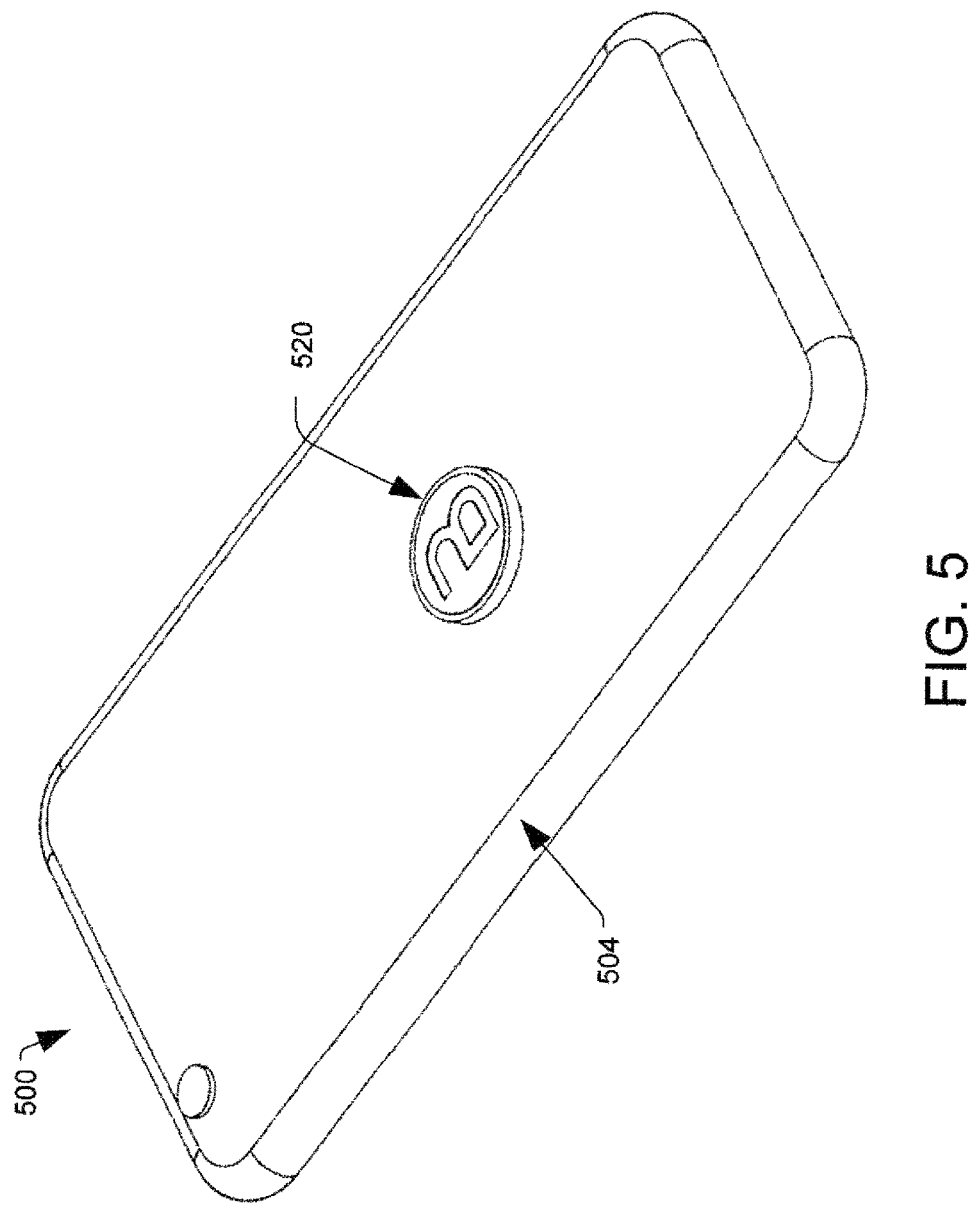
FIG. 5 is a perspective view of a fastener configured to attached to a cellular telephone case and to a detachable speaker system.

FIG. 5 is a perspective view of a system 500 that includes a cellular telephone case 504. A disc-shaped fastener 520 is attached to the case 504. The fastener 520 may be magnetic and configured to attach to a fastener interface 430 such as is illustrated in FIG. 4. The fastener 520 may alternatively attach to most any substantially flat surface. Additionally, while the fastener 520 shown in FIG. 5 is coin-shaped, a fastener of another embodiment may be any other shape.

Figure 6:
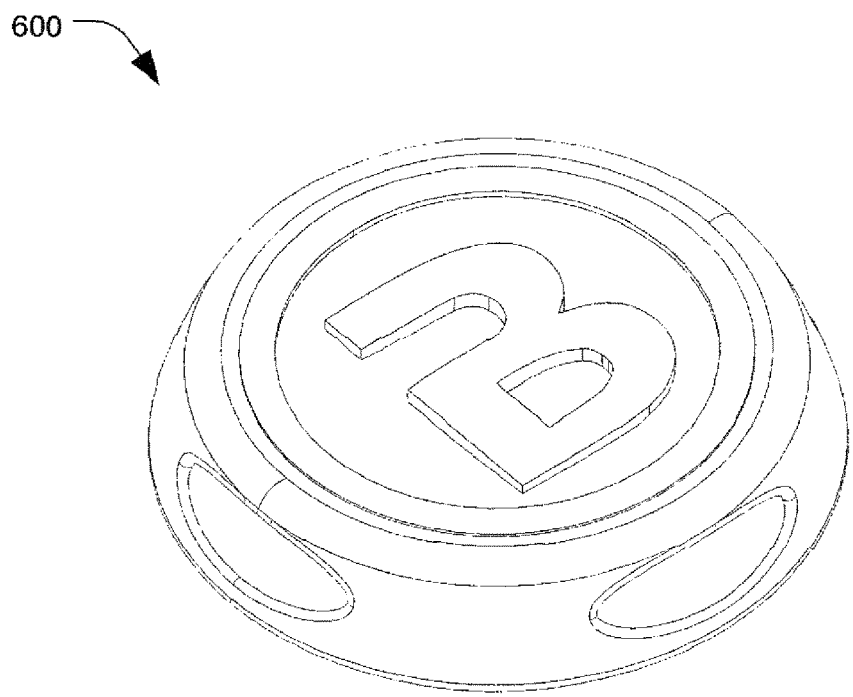
FIG. 6 is a perspective view of a coin that may be used to attach a phone to a surface, such as a wall structure or phone accessory.

FIG. 6 is a perspective view of a coin 600 that may be used to attach a phone to a surface, such as a wall structure or phone accessory (e.g., a selfie stick, a flashlight, a speaker, a battery, etc.). The coin 600 may be similar to the coin 520 shown in FIG. 5. As such, the coin 600 may attach to a case or phone or other electronic device and may attach to a fastener (attached to a wall or other surface) having features configured to attach to the coin 600.

Figure 7:
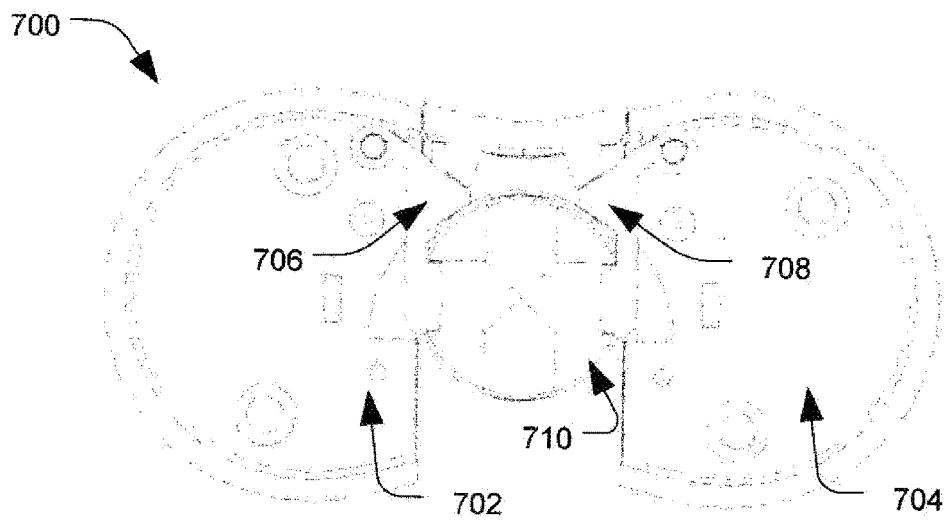
FIG. 7 shows a bottom view of a coin 700 that may be used to attach a phone to a surface.

FIG. 7 shows a bottom view of a coin 700 that may be used to attach a phone to a surface, such as to a wall or a surface of an accessory. The coin 700 may be similar to the coin 600 of FIG. 6. Sections 702, 704 of the coin 700 separate using hinges 706, 708 to accommodate a smaller coin, shape 710. The smaller coin shape 710 may be fixedly or removably attached to a wall or other structure to which a user wishes to attach a phone or other computing device. The smaller coin shape 710 may be one of several that a user has secured to different surfaces for use in temporarily attaching their phone or other electronic device. When secured, the sections 702, 704 may be close back around the smaller coin shape 710. The smaller coin shape 710 may in this matter slide in and out of the coin 700. As with, the dimensions of the coin 700, those of the smaller coin shape 710 could be box or pyramidal or any other geometric combination of shapes.

Figure 8:
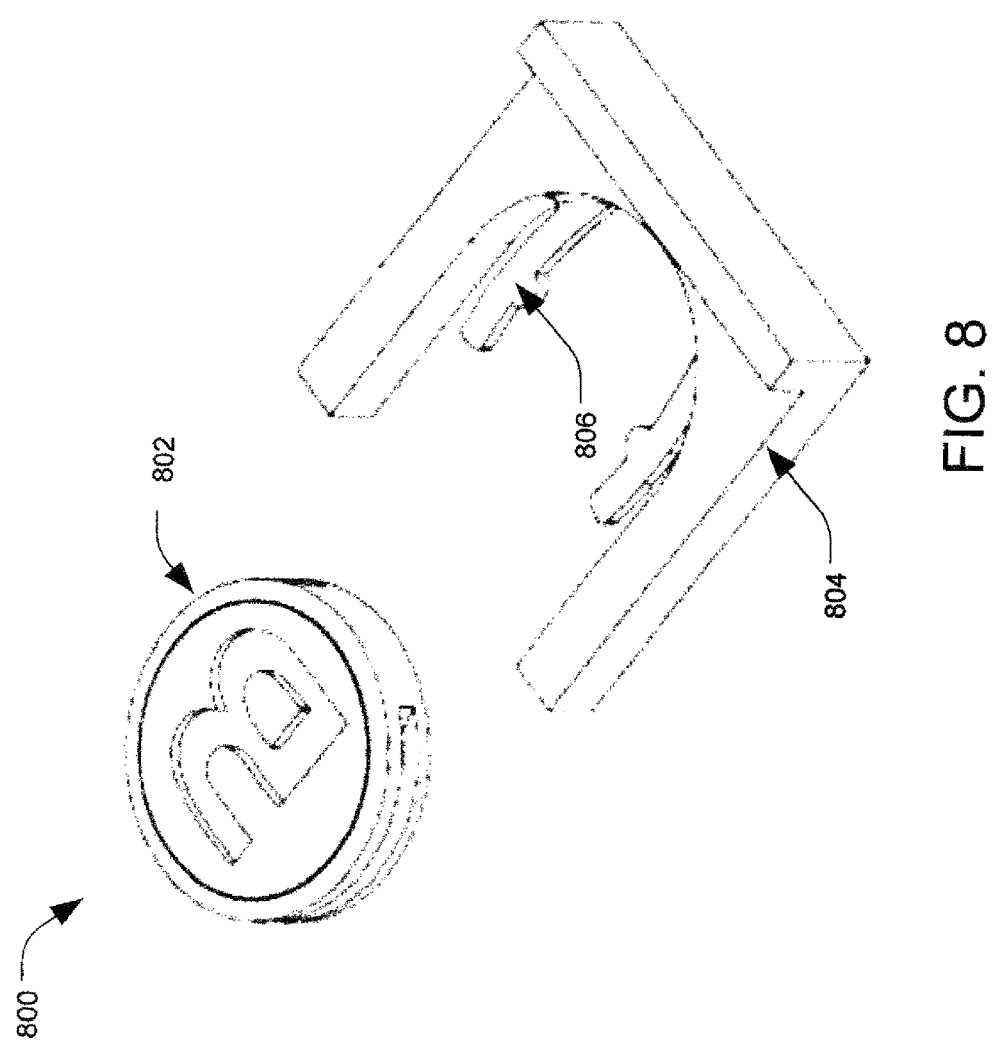
FIG. 8 shows an embodiment of an attachment system that may attach to a coin to a receiving structure.

FIG. 8 shows an embodiment of an attachment system 800 that may attach to a coin 802 to a receiving structure 804. The coin 802 may be similar to the coin 520 shown in FIG. 5. The receiving structure 804 may be configured to allow the coin 802 to slide at least partially inside and may secure the coin 802 using a releasable securement mechanism 806. In an embodiment, the receiving structure 804 may attach to a mounting surface, such as a wall or chair or other surface. The coin 802 may attach to phone or PDA surface. Alternatively, the receiving structure 804 may attach to a phone and the coin 802 of an embodiment may attach to the other surface.

Figure 9:
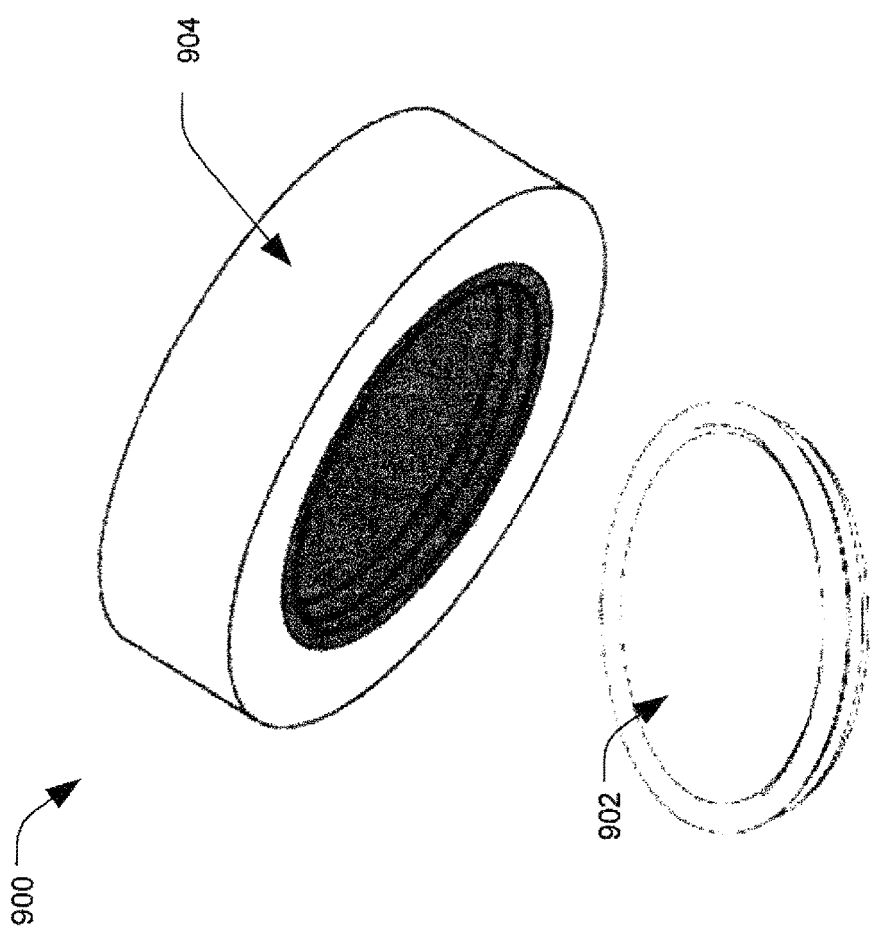
FIG. 9 shows an embodiment of an attachment system that may attach a coin to a securement mechanism using air pressure or suction forces.

FIG. 9 shows an embodiment of an attachment system 900 that may attach a coin 902 to a securement mechanism 904 using air pressure or suction forces. The coin 902 may be similar to the coin 520 shown in FIG. 5. Pressure seal may be achieved using compression of rubber. The rubber may be located on a ring (male part) or on an attached device (female side). Relief cuts, on either the coin or the device may aid in the snapping. As the device is pressed over the coin, the rubber compresses enough to allow the device to snap over the lip.

Other fastener mechanisms may include a knob and slide and groove attachments. Still other fastener mechanisms may include a coin with a threaded surface configured screw into mating threads attached to another portion of the fastener. Fasteners may allow attachment to tripods and selfie sticks, for instance.

Those skilled in the art may make numerous uses and modifications of and departures from the specific apparatus and techniques disclosed herein without departing from the inventive concepts. Consequently, the disclosed embodiments should be construed as embracing each and every novel feature and novel combination of features present in or possessed by the apparatus and techniques disclosed herein and limited only by the scope of the appended claims, and equivalents thereof.

What is claimed is:

1. An apparatus comprising:
   a fastening device comprising a bottom having an attachment mechanism, a top, and a side surface;
   a housing configured to attach to said fastening device; said housing comprising a receiving structure configured to receive the fastening device; said fastening device having said attachment mechanism secured to at least one of a cellular telephone, and a case for the cellular telephone;
   a receiver positioned within the housing; and
   speaker circuitry positioned within the housing.

2. The apparatus of claim 1, further comprising a memory positioned within the housing, wherein the memory stores audio content.

3. The apparatus of claim 1, further comprising a memory positioned within the housing, wherein the memory stores an application configured enable a user to adjust audio tone.

4. The apparatus of claim 1, further comprising a memory positioned within the housing, wherein the memory stores usage information pertaining to what a user listens.

5. The apparatus of claim 1, wherein the receiver is configured to receive at least one of Bluetooth, Wi-Fi, and satellite signals.

6. The apparatus of claim 1, wherein the receiver is configured to receive an audio signal via a wire from the cellular telephone.

7. The apparatus of claim 1, wherein the receiver is configured to function as a speakerphone.

8. An apparatus comprising:
a fastening device secured to a cellular telephone, a housing configured to attach to said fastening device, wherein said housing comprises an indentation configured to receive said fastening device, and a case for the cellular telephone,
wherein the housing is configured to expand selectively and reversibly; and
speaker circuitry positioned within the housing.

9. The apparatus of claim 8, wherein the housing includes first and second surfaces that form an acute angle.

10. The apparatus of claim 8, wherein the housing includes an accordion structure.

11. The apparatus of claim 8, wherein the fastening device is coin shaped, and wherein the housing indentation is configured to receive said coin shaped fastening device; and wherein said housing is distinct from a case of the cellular telephone.

12. An apparatus comprising:
a fastener having a top a bottom and a side, a housing comprising speaker circuitry; an electronic device; and
wherein the fastener comprises an attachment means on the bottom and is configured to removably attach to at least one electronic device, wherein the fastener is configured to removably attach to said housing, wherein the housing comprises a receiving structure to receive said fastener, and wherein said receiving structure comprises a releasable securement mechanism to selectively secure said fastener to said housing.

13. The apparatus of claim 12, further comprising a quick-release button for releasing said releasable securement mechanism.

14. The apparatus of claim 12, wherein the fastener is coin-shaped.

15. The apparatus of claim 12, wherein the attachment means on the bottom of the fastener are selected from at least one of a magnet, an adhesive, a thread, air pressure, a hook and loop fastener, and a mechanically interlocking mechanism.

* * * * *